(12) United States Patent
Chen et al.

(10) Patent No.: US 6,738,762 B1
(45) Date of Patent: May 18, 2004

(54) MULTIDIMENSIONAL SUBSTRING SELECTIVITY ESTIMATION USING SET HASHING OF CROSS-COUNTS

(75) Inventors: Zhiyuan Chen, Hackettstown, NJ (US); Philip Russell Korn, New York, NY (US); Nikolaos Koudas, Springfield, NJ (US); Shanmugavelayutham Muthukrishnan, Washington, DC (US)

(73) Assignee: AT&T Corp., New York, NY (US)

( * ) Notice: Subject to any disclaimer, the term of this patent is extended or adjusted under 35 U.S.C. 154(b) by 291 days.

(21) Appl. No.: 09/994,266

(22) Filed: Nov. 26, 2001

(51) Int. Cl.[7] .............................................. G06F 17/30
(52) U.S. Cl. ........................... 707/3; 707/101; 707/102
(58) Field of Search ................................. 707/1–6, 100, 707/101, 102, 531; 711/154, 168; 715/534; 365/189.01

(56) References Cited

U.S. PATENT DOCUMENTS

| | | | |
|---|---|---|---|
| 5,704,060 A | * | 12/1997 | Del Monte .............. 707/104.1 |
| 5,778,408 A | | 7/1998 | Valentine |
| 5,805,911 A | * | 9/1998 | Miller ......................... 715/534 |
| 5,809,494 A | | 9/1998 | Nguyen |
| 5,852,821 A | | 12/1998 | Chen et al. |
| 5,896,321 A | * | 4/1999 | Miller et al. ........... 365/189.01 |
| 6,115,705 A | | 9/2000 | Larson |
| 6,163,774 A | | 12/2000 | Lore et al. |
| 6,223,182 B1 | | 4/2001 | Agarwal et al. |
| 6,240,409 B1 | | 5/2001 | Aiken |
| 2003/0037209 A1 | * | 2/2003 | Stefan et al. ................ 711/154 |

* cited by examiner

Primary Examiner—Charles Rones

(57) ABSTRACT

An approach for multidimensional substring selectivity estimation utilizes set hashing to generate cross-counts as needed, instead of storing cross-counts for the most frequently co-occurring substrings. Set hashing is a Monte Carlo technique that is used to succinctly represent the set of tuples containing a given substring. Then, any combination of set hashes will yield a cross-count when intersected. Thus, the set hashing technique is useful in three-, four- and other multidimensional situations, since only an intersection function is required.

10 Claims, 9 Drawing Sheets

ID PARSING

FIG. 2b
PRIOR ART

MO PARSING

FIG. 3
PRIOR ART

|     | ab | b | bc | c | abc |
|-----|----|---|----|---|-----|
| 12  | 2  | 3 | 2  | 2 |     |
| ~~123~~ | ~~1~~ | ~~2~~ | ~~2~~ | ~~2~~ | ~~1~~ |
| 23  | 2  | 3 | 2  | 2 |     |
| 2   | 3  | 4 | 2  | 2 |     |
| 3   | 2  | 3 | 2  | 2 |     |

MULTIDIMENSIONAL SUBSTRING SELECTIVITY ESTIMATION USING SET HASHING OF CROSS-COUNTS

TECHNICAL FIELD

The present invention relates to query processing of textual data stored in miultidimensional data sets and, more particularly, to a method of estimating co-occurrence of query substrings across the dimensions of the data set.

BACKGROUND OF THE INVENTION

In recent years, a new suite of services (such as LDAP directory services), standards (such as XML), and applications (such as E-commerce) have emerged, due at least in part to the proliferation of the Internet. Handling large amounts of text (as opposed to numeric data) is central to such Internet-related technology. Thus, there has been a resurgence of interest in the storage, management and query processing of textual data.

In many applications involving databases that process textual data, users pose (sub)string queries, which may either search for exact matches, or contain wildcards. For example, in an E-commerce catalog search, a user might inquire about all teal colored polo shirts that were sold during the month of June, 2001—this would be an example of an exact match on two separate attributes, namely, color and sale status (i.e., a two-dimensional query). In an LDAP directory search, a user might inquire about all people whose first name begins with the letters "Jo" (i.e., a "prefix" match), and whose phone number contains the sequence of digits "360" (a "substring" match). These examples can be expressed in structured query language (SQL) using the LIKE clause: WHERE color LIKE 'teal' AND sales LIKE '062001' and, respectively, WHERE name LIKE 'Jo%' AND phone LIKE '%360%'. It is to be noted that the queries can specify any combination of exact, prefix, suffix, or proper substring matches.

In order to optimize such queries, particularly multidimensional queries, it is often useful to obtain fast and accurate estimates for their result sizes. One problem in the field of multidimensional substring selectivity estimation is related to the estimation of the fraction of tuples in the database that contain the query string as a substring in each dimension (also referred to as "attribute"), where prefix and suffix constraints can easily be reduced to substring constraints. Such an estimate may also suffice as an approximate answer to a COUNT query that returns the number of tuples in the database which contain the query as a substring in each attribute. Further, fast and accurate estimates for multidimensional string selectivity estimation may also help in refining queries in an online data analysis environment. As in any selectivity estimation, multidimensional string estimation methods must provide acceptable accuracy (for example, no more than 10–20% error) using a data structure that is allowed only a limited amount of space (i.e., small enough to reside in a main memory, but typically, significantly smaller). In addition, the time needed to build the data structure should not be prohibitive so that periodic rebuilding is feasible. Finally, online estimation must be fast (on the order of a fraction of a second), even when working with a massive data structure.

Multidimensional selectivity estimation has been an active area of research for many years. Most work in this area, however, has focused on numerical attributes and has assumed the existence of a mapping from multidimensional categorical data to fully ordered domains. In the case of multidimensional string queries, however, such mapping is of no use. For example, if the strings are sorted lexicographically, the substrings are not necessarily ordered. In the extreme of presuming that all substrings are explicitly represented and the frequency of individual points is approximated in the multidimensional space using standard techniques, the domain would be so large and the frequencies so small as to render the techniques impractical. An end-biased histogram approach may be used as an alternative, retaining only the substrings with the highest counts, subject to constraints on space, and approximating the other substrings assuming uniformity. Since the total number of substrings is very large, this approach would be very close in accuracy to one that makes the uniformity assumption, which is known to be highly inaccurate. Moreover, the need to retain all substrings with high counts becomes aggravated as the dimensionality increases.

New approaches for selectivity estimation tailored to the string domain have been developed in recent years. These approaches share a common framework of first performing a precomputation to store the number of tuples that contain the most frequently co-occurring substrings, defined as the "cross-counts". Online estimation then involves parsing the query into subqueries such that the cross-count for each subquery is available from the precomputation process. The effectiveness of any particular approach within this framework relies on the prudent utilization of cross-counts.

Figure 1A:
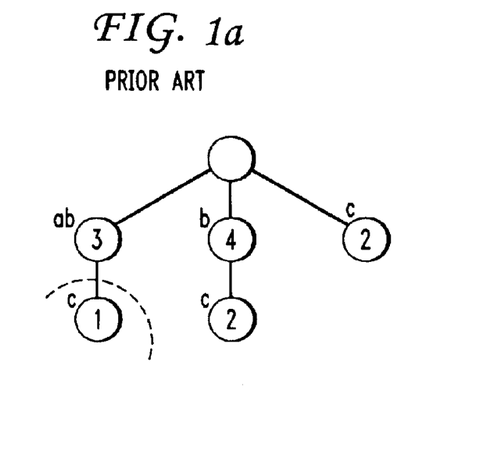
FIG. 1 contains a prior art diagram of pruned suffix trees (PSTs) for a four element data set on two dimensions.
Figure 1B:
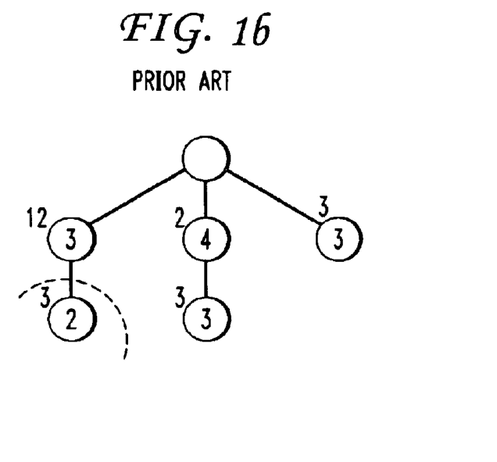
Figure 2A:
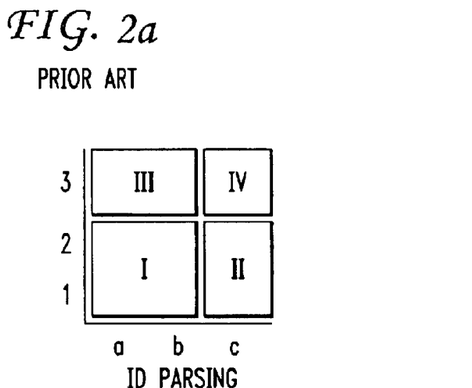
FIG. 2 illustrates different known art parsing arrangements that can be used with the data of FIG. 1.
Figure 2B:
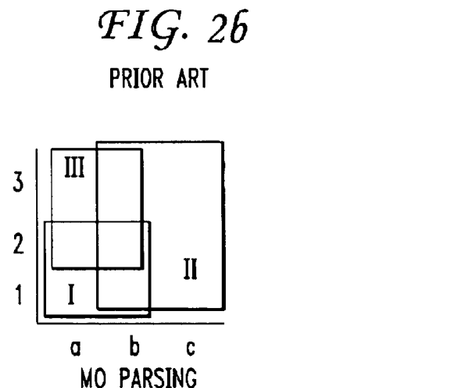

One exemplary prior art technique for estimating cross-counts of string data is based on a variant of suffix trees and is referred to as the "count-suffix trees" method, where each node in the tree is augmented with the count of occurrences of its associated substring. The method maintains k suffix trees (one for each dimension), and a matrix for storing the cross-counts, that is, the number of occurrences of all substring combinations from each dimension. In order to limit the space used, a "pruning threshold" may be defined, and each suffix tree pruned to form a Pruned Suffix Tree (PST), each PST having at most m nodes (where, for simplicity, the value of m is uniform across the dimensions). FIG. 1 illustrates the pair of PSTs for the data set: (ab, 12), (abc, 123), (bc, 123), (ab, 23). FIG. 1(*a*) includes the PST for the alpha data dimension, and FIG. 1(*b*) includes the PST for the numeric data dimension. Each node is defined by its substring, and illustrated within each node is the number of occurrences of that substring in the data set. In this case, the alpha data dimension is parsed into ab, b, and c, and the numeric data dimension is parsed into 12, 2 and 3. This parsing is a form of "greedy parsing" (i.e., includes overlap), and is illustrated diagrammatically in FIG. 2(*a*).

Figure 3:
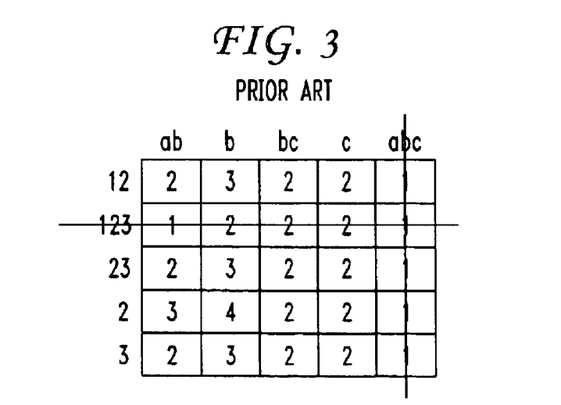
FIG. 3 is prior art matrix illustrating the exact cross-counts for the parsed data sets associated with FIG. 1 and FIG. 2(a)

FIG. 3 contains a matrix of each of the cross-counts between the parsed substrings. For example, the cross-count between ab and 2 is "3", meaning that there are three different substrings that include the combination of ab with 2. As with the trees illustrated in FIG. 1, the matrix of FIG. 3 is also "pruned", as shown by the line through the row of cross-counts associated with the substring 123 and the column of cross-counts associated with the substring abc.

Using the above example of a multidimensional (2-dimensional) query q—(abc, 123), abc is parsed into pieces ab and c; 123 is parsed into pieces 12 and 3, where the query is used to determine the "cross-count" between abc and 123. The subqueries resulting from the greedy parsing come from the cross-product of the pieces: (ab, 12), (c, 12), (ab, 3) and (c, 3). The associated subquery selectivities are then multiplied based on the independence assumption as follows:

$$Pr\{(abc, 123)\} = Pr\{(ab, 12)\} \times Pr\{(c, 12)\} \times Pr\{(ab, 3)\} \times Pr\{(c, 3)\}$$

$$= 2/4 \times 2/4 \times 2/4 \times 2/4 = 1/16.$$

Of course, this solution of "1/16" is an exact solution, since this data set contains only four elements and it is straightforward to calculate each quantity.

Figure 4:
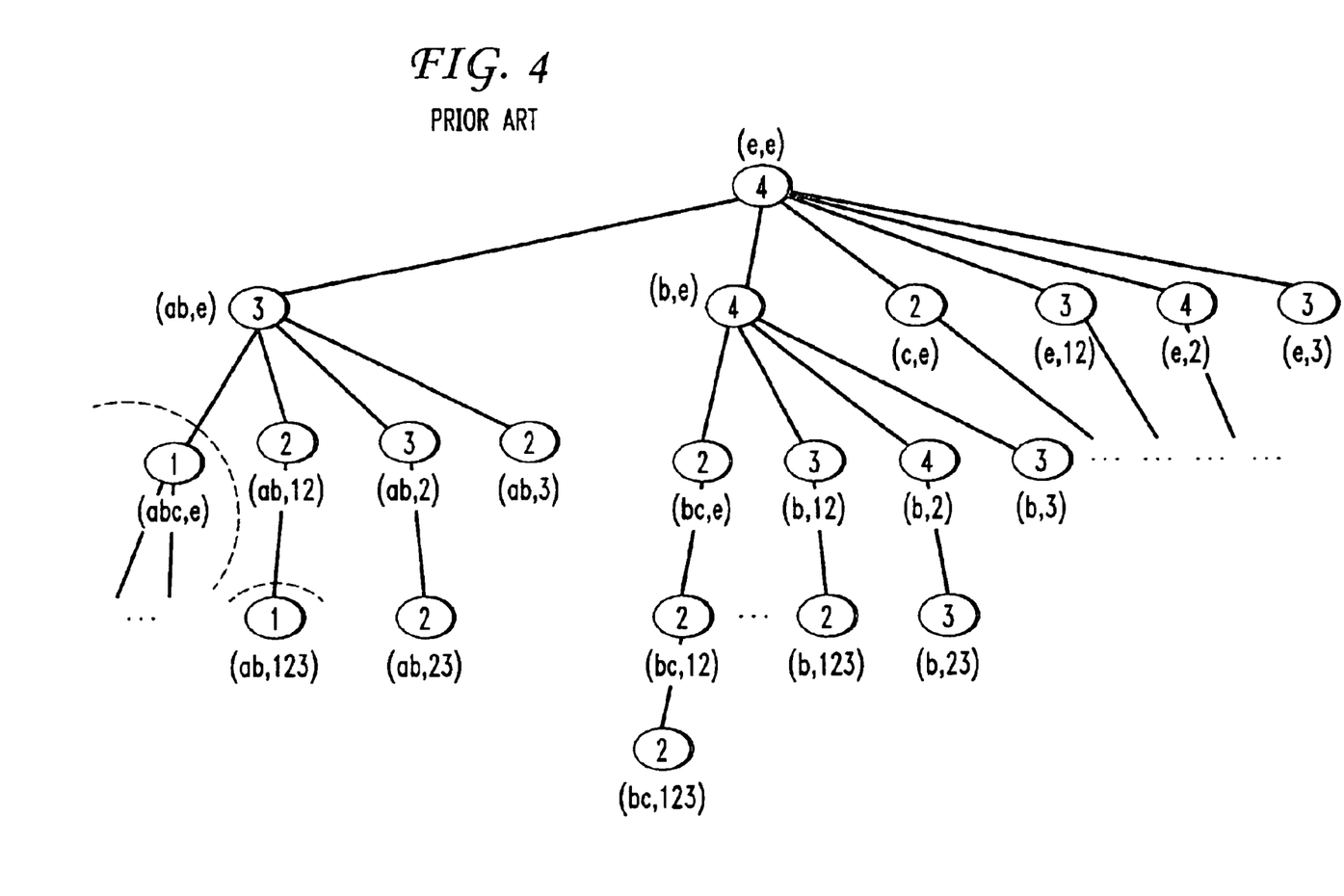
FIG. 4 contains a prior art diagram of a pruned k-d count-suffix tree for the same data set as discussed above.

An alternative method known in the prior art is denoted "k-d count-suffix trees" (or "KD"), in which each node corresponds to substring combinations from each dimension, and each node is augmented with the substring counts. FIG. 4 illustrates an exemplary pruned k-d count-suffix tree for the data set example defined above (that is, for the four element data set (ab, 12), (abc, 123), (bc, 123), (ab, 23)). Since the capture of all combinations would require space exponential in k, a pruned data structure is generally employed, where an exemplary pruning cut line is shown in FIG. 4. In the KD method, a query q is parsed using the maximal overlap (MO) principle, where in a greedy fashion the query q is broken into a plurality of subqueries overlapping in multiple dimensions. Each subquery is defined as the match in the tree that most overlaps the prior subquery. The cross-count for each such subquery is obtained by a simple lookup in the k-d tree for the node associated with the subquery. These cross-counts can then be combined using conditional probabilities of the subqueries based on the inclusion-exclusion principle from set theory. In particular, $$Pr\{(abc, 123)\} = \frac{Pr\{I\} \times Pr\{II\} \times Pr\{III\} \times Pr\{I \cap II \cap III\}}{Pr\{I \cap II\} \times Pr\{I \cap III\} \times Pr\{II \cap III\}}$$

$$= \frac{\frac{2}{4} \times \frac{2}{4} \times \frac{2}{4} \times 1}{\frac{3}{4} \times \frac{3}{4} \times \frac{3}{4}} = \frac{8}{27}$$

Both of the above-described prior art methods share the following common framework: (1) preprocessing: a compact structure is constructed by these methods to store cross-counts of substring occurrences in the database, employing pruning techniques to reduce the size; (2) query parsing: a query q is parsed into smaller subqueries $q_{usb}$ that match nodes in the pruned structure and have associated cross-counts; (3) cross-count lookup: the count $c_j$ associated with each $q_{sub}$, that is, the number of times $q_{sub}$ occurs in the database, which is determined from the stored structure; and (4) probabilistic estimation: a probabilistic formula is used to algebraically "combine" the $c_j$'s to derive the selectivity estimate Pr(q). For example, in the first method, preprocessing builds PSTs and the cross-count matrix, parsing is greedy, cross-count lookup involves matrix look-up, and estimation is a product operation. In the latter method (the KD method), preprocessing builds a pruned k-d count-suffix tree, parsing is based on maximal overlap, cross-count look-up involves traversing the tree, and estimation is a more sophisticated production operation given by inclusion-exclusion.

While both of these methods are effective when working with only two dimensions and a relatively small number of tuples in the data set, they suffer from a "space dimensionality explosion", since both methods may consume an exponential amount of storage space for storing cross-counts. In order to cope with space constraints, pruning is applied as discussed above. In doing so, these methods then only maintain cross-counts for combinations of short substrings—as dimensions increase, these substrings get significantly shorter. As a result, the probability of locating any given subquery is small and queries wind up being parsed into many small subqueries. Thus, these known methods end up relying on probabilistic estimation for their overall accuracy, where this has proven to be inaccurate.

Thus, a need remains in the prior art for a reasonable method of determining cross-counts in multidimensional data sets that neither "explodes" as the number of dimensions increase nor yields results that are inaccurate and unable to be used.

SUMMARY OF THE INVENTION

The need remaining in the prior art is addressed by the present invention, which relates to multidimensional substring selectivity estimation and, more particularly, to an estimation technique that utilizes set hashing to represent the tuples containing a given substring and the generation of cross-counts, in real time, from an intersection of the hash values.

The methodology of the present invention is set-oriented, where pruned suffix tress (PSTs) are first constructed on each dimension. A set is created for each node in each tree, the set containing the row identifiers (RIDs) of each tuple containing that node in its substring. Since each of these sets may be as large as N (the number of tuples in the database), a hash function is used to compact the set value. Cross-counts are then approximated by estimating particular hash value set intersections.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

A basic premise of the present invention is the realization that it is not necessary to have exact cross-count values in order to achieve accurate multidimensional selectivity estimation. Rather, it has been found that approximate values can yield accurate selectivity estimates, where a priori errors in approximating cross-counts will not compound the inherent errors in using probabilistic estimation formulae. The overall reasoning is that, if cross-counts can be approximated using small space, then for a given budget of space, information can be stored about more combinations of substrings than is possible with prior art arrangements. Equivalently, substring combinations that have precomputed cross-counts will be longer than in prior art methods. Advantageously, therefore, longer parses can be used, with less reliance on probabilistic estimation formulas and more accurate selectivity estimation.

Figure 5A:
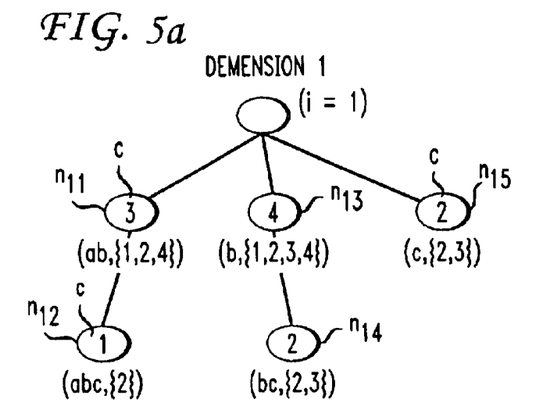
FIG. 5 contains a pair of suffix trees augmented with the row identified set information used in the method of the present invention.
Figure 5B:
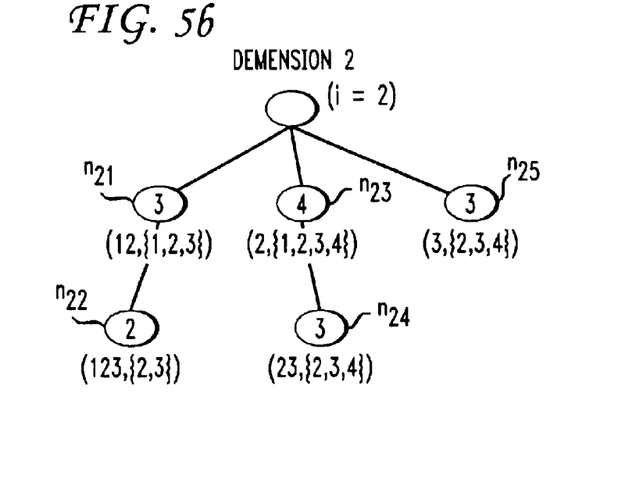

In accordance with the present invention, a "set-based" approach is used to achieve cross-count estimation, resulting in requiring only a linear amount of storage, but nevertheless able to generate an exponential number of cross-counts (in terms of the k dimensions associated with the dimensionality of the data set). In particular, the methodology of the present invention first requires that an "unpruned" suffix tree be built for the substrings in each dimension. The string labeling the jth node of the ith suffix tree is denoted as $w_{ij}$. This is the string that "spells" the path from the root of the ith suffix tree to its jth node. Each node $n_{ij}$ in each suffix tree is then augmented with set $S_{ij}$, where $S_{ij}$ contains the row identifiers (RIDs) of each tuple containing $w_{ij}$ as a substring in the ith dimension. FIG. 5 illustrates an example of the set approach of the present invention, using the same data set as discussed above with the previous figures, namely (ab, 12) (row identifier 1), (abc, 123) (row identifier 2), (bc, 123) (row identifier 3), and (ab, 23) (row identifier 4). For this two-dimensional data set, two suffix trees have been created as shown, with a first tree (FIG. 5(a)) associated with the first dimension of the data set, and a second tree (FIG. 5(b)) associated with the second dimension of the data set. Each node n includes a count, labeled c, of the number of tuples (i.e., data elements) containing that substring. Each set $S_{ij}$ is denoted as (x, {y}), where "x" is the particular substring associated with that node $n_{ij}$ and "y" is the set of unique row identifiers (RIDs) for each data set element containing that substring. Referring to node $n_{11}$ of the tree of FIG. 5(a), $S_{11}$ is illustrated as comprising the substring ab, which occurs in RIDs 1, 2 and 4, as defined for the above-identified data set. Thus, the count $c_{11}$ stored at node $n_{11}$ has a value of "3". The set values associated with each node $n_{ij}$ is calculated in a similar manner, where (for example), node $n_{13}$ is defined by a set comprising the substring b, which occurs in each data set element {1,2, 3, 4}. The count $c_{13}$ is therefore "4", as illustrated within node $n_{13}$.

With this simplified arrangement of a two-dimensional data set of four elements, it is possible to compute the selectivity of any substring query without error simply by intersecting the sets corresponding to each dimension. For example, define a query (a two-dimensional substring query) as q=(abc, 123). The proper nodes j and k are located in each tree such that $w_{1j}$ is equal to abc and $w_{2k}$ is equal to 123. Referring to FIG. 5(a), node $n_{12}$ is associated with substring abc and referring to FIG. 5(b), node $n_{22}$ is associated with substring 123. The selectivity (i.e., answer to the query) is then found by the intersection of sets $S_{12}$ and $S_{22}$, divided by the total number N of data elements in the set. This is defined as shown below:

$$\frac{|S_{1j} \cap S_{2k}|}{N} = \frac{|\{S_{12}\} \cap \{S_{22}\}|}{N} = \frac{|\{2\} \cap \{2, 3\}|}{4} = \frac{1}{4}$$

While the use of sets as defined above is extremely accurate in determining the selectivity and defining the result of the query, problems (in particular, storage space problems for the sets) arise when N (the total number of elements in the data set) and k (the number of dimensions of data stored for each element) grow large. As stated above, and as shown in FIG. 5 with nodes $n_{13}$ and $n_{23}$, any set may be as large as N (the total number of tuples in the database). Pruning is not helpful in this situation, since very few nodes would remain on which to base estimations. In accordance with the present invention, therefore, it is recognized that a hash function may be used to store the sets associated with each node. The hash function serves two purposes: (1) the hash value of a set can be stored in a much smaller space than the set itself (typically, 100 to 400 bytes); and (2) the hash functions can be used to compute the size of the intersection of any k sets, thus providing the cross-counts required to apply the probabilistic estimation formulas. A problem to be addressed, however, is that there are no existing hash functions that exhibit both small space (i.e., significantly less than N) and provide exact count information of the intersection of any k sets (even for the two-dimensional case where k=2). Thus, in accordance with the present invention, hash functions are used that allow for some approximation in estimating the intersection sizes. This will require only O(mk) space, where m is the number of nodes in each PST (in this above example, m=5) and k is the dimensionality. Thus, the particular example described in association with FIG. 5 will require O(10) space, which is linear in the size of the PSTs.

Summarizing the methodology of the present invention, PSTs are first created on each dimension and sets associated with each node are created and then transformed into a hashed value. From any arbitrary combination of substrings from different dimensions, a cross-count is approximated by estimating the set intersection cardinality of the nodes using hashes. The trade-off with respect to the prior art is that a much larger number of cross-counts can be reconstructed in the present invention than could be stored using prior art methods, but at the loss of accuracy of the counts. A given query is parsed, as with the prior art, and the required cross-counts are generated from the set hashes. Probabilistic estimation formulae are then used, as before, to obtain the overall selectivity.

In general, "set hashing" is a Monte Carlo technique for sets that can be used as an unbiased estimator for the cardinality of the "set resemblance" (denoted as ρ) between k different sets. Reduced to a relatively simple example using only two sets A and B, the set resemblance p can be defined as follows:

$$\rho = \frac{|A \cap B|}{|A \cup B|},$$

where for any set S, the notation |S| represents its cardinality.

Figure 6A:
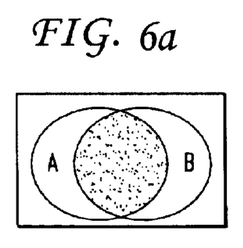
FIG. 6 contains a set of three Venn diagrams illustrating the concept of set resemblance as used in the present invention.
Figure 6B:
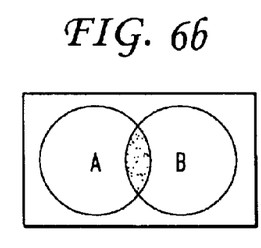
Figure 6C:
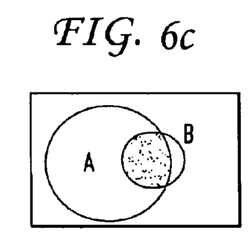

FIG. 6 is useful to aid in the intuitive understanding of the concept of set resemblance, where FIG. 6(a) illustrates an example of high overlap between sets A and B, with "high" resemblance; FIG. 6(b) illustrates an example of low overlap, low resemblance; and FIG. 6(c) illustrates the case of high overlap, low resemblance. Intuitively, presume that "darts" are thrown randomly at a universe U. If two sets have high resemblance (as is the case for FIG. 6(a)), then it is more likely that the first dart to hit one set (such as set A) will also hit the other set (in this example, set B). In accordance with the present invention, therefore, signature vectors $S_{ij}$ are created for each pair of sets, where these signatures can then be operated on directly to estimate the set resemblance between any pair of sets. In keeping with the intuitive discussion, the idea is to "throw darts" at universe U from which all sets are drawn until an element of a set being analyzed (e.g., set $S_A$) is "hit". When this occurs, the value of this element is recorded as a component value in the signature vector $S_A$. A predefined number of "throws" are used to create a signature of a desired length. This process is then repeated (using the exact same throws) for each dimension to generate the associated signature vector. Thus, in the example as associated with FIG. 6, a second set of dart throws would be used to generate a second signature vector designated as $S_B$. Finally, $\hat{\rho}$, as an estimate of ρ, is determined from the number of respective signature vector components in $S_A$ that match components in $S_B$.

More particularly, for each signature vector component, the elements of universe U from which each set is drawn are randomly permuted and the first element value in the permutation which is also a value of the set being studied is recorded as a component value in the signature vector. More formally, let U={1, 2, ..., n} and let π be chosen uniformly at random over the set of permutations of U. The minimum value of this permutation, defined min{π(A)}, is equal to min{π(x)|x∈A}. Then, $$Pr(\min\{\pi(A)\} = \min\{\pi(B)\}) = \frac{|A \cap B|}{|A \cup B|}$$

It is to be noted that the same permutation is used for each set. Then, for any given set A, the signature vector is generated from the permutation $\pi_1, \pi_2, \ldots \pi_l$, where $$S_A = (\min\{\pi_1(A)\}, \ldots, \min\{\pi_l\}).$$

Figure 7A:
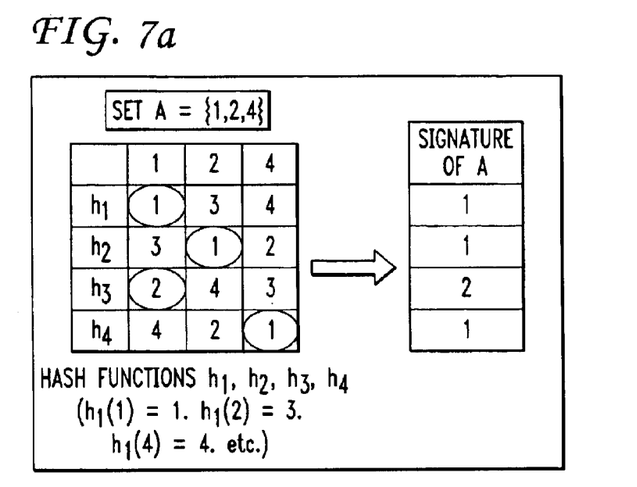
FIG. 7 illustrates the use of hashing functions to create signature vectors for a pair of data sets, as well as the process step used to compare the signature vectors.
Figure 7B:
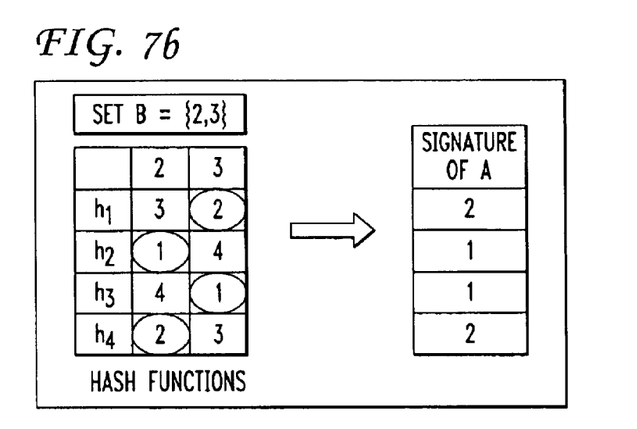
Figure 7C:
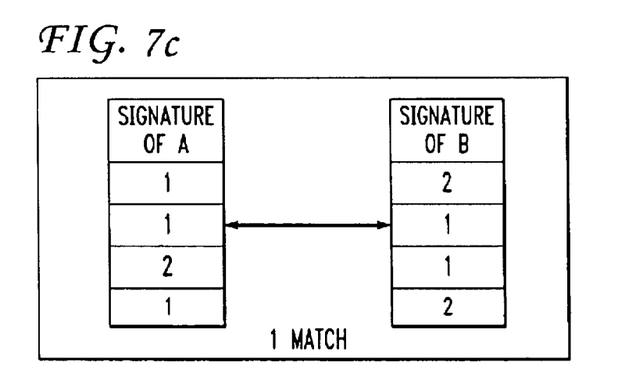

In accordance with the present invention, a hash function is seeded for each signature vector component and the hash image h(a) is generated for each element a ∈ A. The minimum h(a) is then recorded in the signature. FIGS. 7(a) and (b) illustrate this seeding and recording of signatures for a pair of exemplary sets, in this case sets $S_{11}$ and $S_{22}$, associated with nodes $n_{11}$ and $n_{22}$ from FIG. 5. In this example, a set of four hash functions is shown, along with their generated values. FIG. 7(c) illustrates the next step in the process, that of comparing the signatures and finding their intersection. In this simplified example, it is easy to determine the set resemblance by matching the signatures.

As shown, the values of only the second hash function match, thus providing a set resemblance ρ of ¼. More formally, $$\hat{\rho} = \frac{|\{i \mid 1 \le i \le \ell, \min\{\pi_i(A)\} = \min\{\pi_i(B)\}\}|}{\ell}$$

It can be shown that using this approximation, if ρ is the exact resemblance between two sets, and l is the length of the signature, then there exists a constant c such that, for any 0<ε<1, $$Pr(|\hat{\rho} - \rho| \ge \epsilon \rho) \le e^{-c\epsilon 2l}$$

where e is the base of the natural logarithm, ln. That is, the probability that the estimate ρ̂ differs from ρ is exponentially decreasing with an increasing value of l.

For a multidimensional case where k is greater than 2, the resemblance between the k sets is more generally defined as follows:

$$\rho_k = \frac{|A_1 \cap A_2 \cap \ldots \cap A_k|}{|A_1 \cup A_2 \cup \ldots \cup A_k|}$$

The procedure for generating the estimated value $\hat{\rho}_k$ as related to $\rho_k$ can be obtained from the following:

$$\hat{\rho}_k = \frac{|\{i \mid 1 \le i \le \ell, \min\{\pi_i(A_1)\} = \min\{\pi_i(A_2)\} = \ldots = \min\{\pi_i(A_k)\}\}|}{\ell}$$

where l, as before, is the number of hash functions used. Thus, the following is observed for any i:

$$Pr(\min\{\pi_i(A_1)\} = \min\{\pi_i(A_2)\} = \ldots = \min\{\pi_i(A_k)\}) = \rho_k$$

The goal of the method of the present invention is to extract intersection size (i.e., the response to the cross-count approximation) using set hashing. Using the simplified example of two sets, this intersection is expressed as |A∩B|, which can be estimated as follows:

$$|A \cap B| = \frac{\rho(|A| + |B|)}{1 + \rho}$$

where ρ is the "set resemblance" between A and B, as defined above. An alternative approach is required for any k-way intersection, and can be developed as follows. First, the signature $S_{A_1 \cup A_2 \cup \ldots \cup A_k}$ of $A_1 \cup A_2 \cup \ldots \cup A_k$ can be computed from the signature $S_{A_j}$ for set $A_j$ as follows. For any i, 1≤i≤l, $$S_{A_1 \cup \ldots \cup A_k}[i] = \min\{S_{A_1}[i], \ldots, S_{A_k}[i]\}.$$

Thus, for each component, the minimal value of the signatures of all the sets in that component are chosen. First, a value γ is determined, knowing the largest sized set $A_j$, as follows:

$$\gamma = \frac{|A_j|}{|A_i \cup \ldots \cup A_k|}$$

Then, the following formula is used to define the intersection of multiple sets:

$$|A_1 \cap A_2 \cap \ldots \cap A_k| = \rho_k |A_1 \cup \ldots \cup A_k| = \frac{\rho_k |A_j|}{\gamma}$$

Summarizing, the approach of the present invention can be described as containing the following steps: (1) preprocessing—a PST is constructed for each dimension, applying known pruning strategies wherein each node in each PST, the exact count of the number of row ID's of that substring is stored and set hashing is then used to create the signature of the set of all tuples that contain that substring, the signature also stored with the node; (2) query parsing—a query q is parsed on each dimension i independently into a number of smaller subqueries that precisely match nodes in each associated PST for each dimension i; (3) cross-count generation—for each combination of these subqueries from each dimension, the associated cross-count is generated by intersecting the signatures for each relevant node; and (4) probabilistic estimation—using a suitable probabilistic formula, the cross-counts are algebraically combined to derive the selectivity estimate Pr(q).

Figure 8:
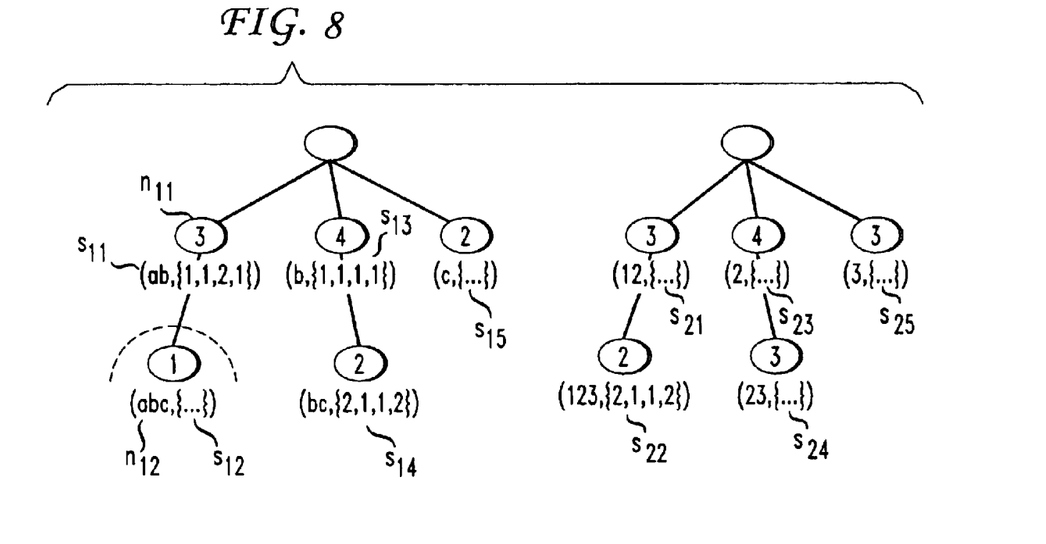
FIG. 8 is a reconfiguration of the pruned suffix trees (PSTs) of FIG. 5, formed to include signature vectors in place of the set of row identifiers.

The following details the application of this set hashing approach of the present invention to the data set described above in association with FIG. 5. In particular, reference is made to FIG. 8 which includes the PSTs for the same data set in two dimensions as discussed above with FIG. 5. In the example as illustrated in FIG. 8, the various signatures $S_{ij}$ for each node are also shown, where the hash function relationship as illustrated in FIGS. 7(a) and 7(b) may be used to generate the signatures for each node. The doted line surrounding node $n_{12}$ indicates where the suffix tree has been pruned along that dimension. Once the signatures for a data set have been generated and stored, this information can be used to respond to any query placed on the data set (with the on-going assumption that as data is added to or deleted from the data set the signatures are regenerated). The organization of the data set in FIG. 8 can be defined as the "preprocessing" step of the present invention, related to the creation of the PSTs and signatures for the data set.

Figure 9:
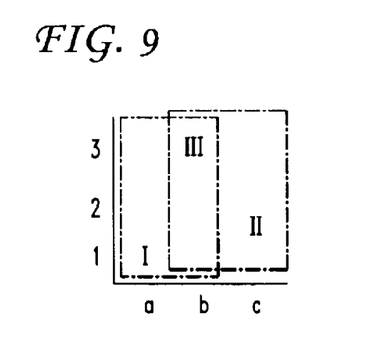
FIG. 9 illustrates the concept of maximal overall parsing as it is applied to the query q=(abc, 123), with respect to the exemplary data set used above.

In using this data set, the method of the present invention moves on to the step of "query parsing". For the purposes of this example, presume the following two-dimensional query is presented to this data set:

q=(abc, 123), where it is desired to estimate the number of cross-counts that satisfy this query. Obviously, for the exemplary data set, an exact response can be obtained. In most circumstances, however, the sheer size of the data set prohibits such a response and an estimate is sufficient. Using the technique of the present invention, query q is parsed on each dimension into a number of smaller subqueries that match nodes within each PST. Using the maximal overlap (MO) parsing with this query, the substring abc is parsed into ab and bc, and the substring 123 is parsed into 123, as shown in FIG. 9. The dashed boxes in FIG. 9 indicate the approximate counts associated with each parsing, where it is to be remembered that the cross-count for overlap region III is also computed. In the look-up step, the cross-counts for (ab, 123), (bc, 123) and (b, 123) are generated via set hashing, where these generated cross-counts may have the values of 0.27, 0.44 and 0.63, respectively. Then, using probabilistic estimation, the selectivity estimate Pr(q) can be computed as follows:

$$Pr\{(abc, 123)\} = \frac{Pr\{(ab, 123)\} \times Pr\{(bc, 123)\}}{Pr\{(b, 123)\}} = \frac{.27 \times .44}{.63} = .1886$$

The utilization of the set hashing technique with larger data sets has been investigated and found to be reliable for both positive queries (substring queries existing in the data set) and negative queries (substring queries not present in the data set). Two relatively large, public data sets were used to investigate the performance of set hashing: EVENT (a data set of 200K events (6MB) logged by an AT&T service with attributes event_name and bundle); and SERVICE (a data set of 130K AT&T customers (5MB) with billing replicated as both the first and second attributes). Of course, there is a much higher correlation between the attributes of SERVICE than there is between the attributes of EVENT.

Positive queries were randomly sampled from within strings of each data set. The tuples from which these substrings come were uniformly chosen. For each attribute, the start position was then uniformly chosen, and the length varied (also uniformly) between 2 and 7 characters. Negative queries were generated in a similar manner, except that each attribute came from a different tuple so that the query would not find a full match. All workloads consisted of 1000 queries, where four different workloads were used, each having a different selectivity. In particular, workload U consisted of queries uniformly selected over a range of selectivities; workload L consisted of queries with selectivity lower than 0.1%, workload M consisted of queries with selectivities in the range of 0.1 and 1%, and workload H consisted of queries with selectivities greater than 1%. For positive queries, the following error measure was used:

$$E_{abs} = \frac{1}{N} \sum_{q \in Q} \frac{|S_q - S'_q|}{S_q},$$

where $S_q$ and $S'_q$ are the actual and the estimated selectivities, respectively. For negative queries, the following root-mean-square error formula was used:

$$E_{std} = \sqrt{\frac{1}{N} \sum_{q \in Q} (S_q - S'_q)^2}$$

In the investigation, it was found that the inventive method based on set hashing was substantially more accurate than the various prior art estimation methods discussed above. For example, in the case of positive queries, the accuracy was better by up to an order of magnitude. The accuracy was even better for negative queries. Moreover, the distribution of errors was found to be considerably more favorable for the inventive set hashing method in the instances where certain queries yielded poor estimates. In particular, for the set hashing method, the number of cross-counts that can be generated increases quadratically, bringing about a rapid drop in the error. This is in contrast to the linear growth in the number of cross-counts explicitly stored in the prior art methods, thus resulting in a slower drop in error.

Figure 10A:
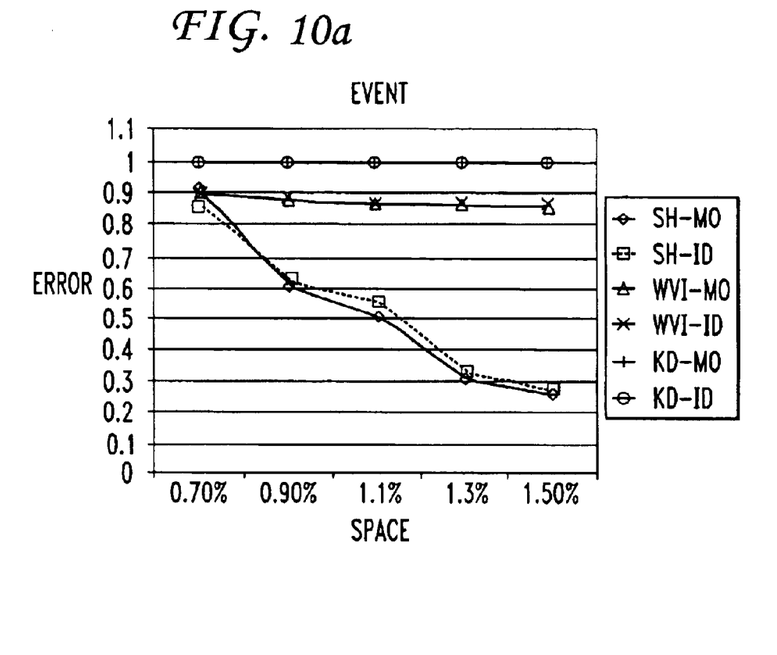
FIGS. 10(a) and 10(b) contain graphs comparing average error of the inventive set hashing method with respect to various prior art techniques, associated with posing positive queries to different large data sets.
Figure 10B:
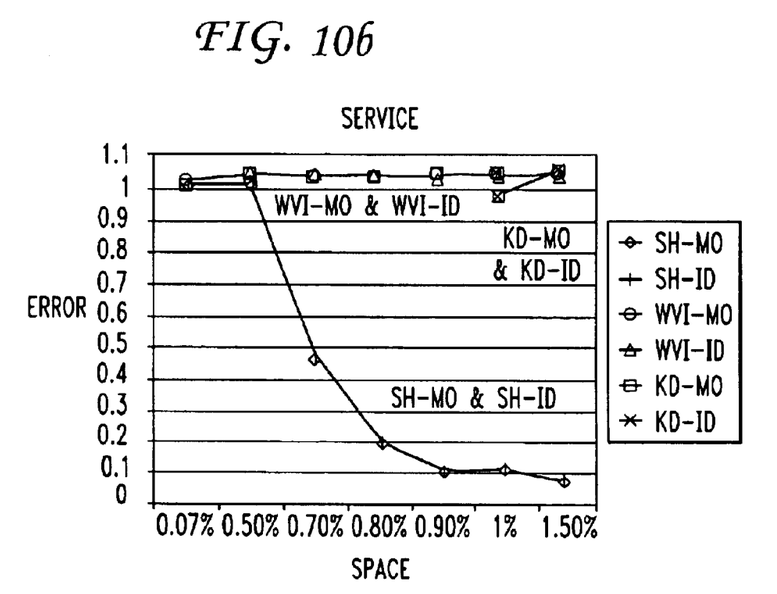
Figure 11A:
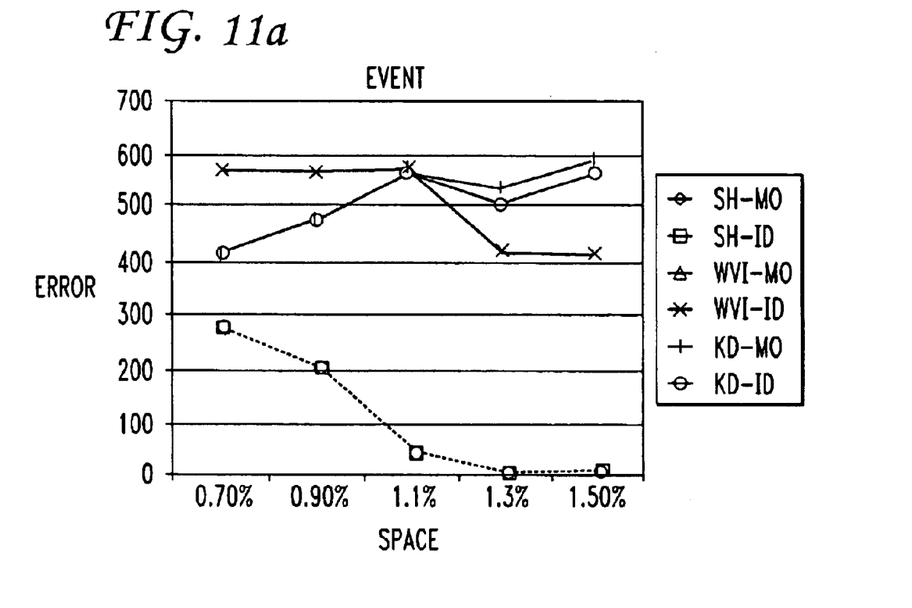
FIGS. 11(a) and 11(b) contain graphs comparing average error of the inventive set hashing method with respect to various prior art techniques, associated with posing negative queries to the same large data sets as used to generate the graphs of FIGS. 10(a) and 10(b)
Figure 11B:
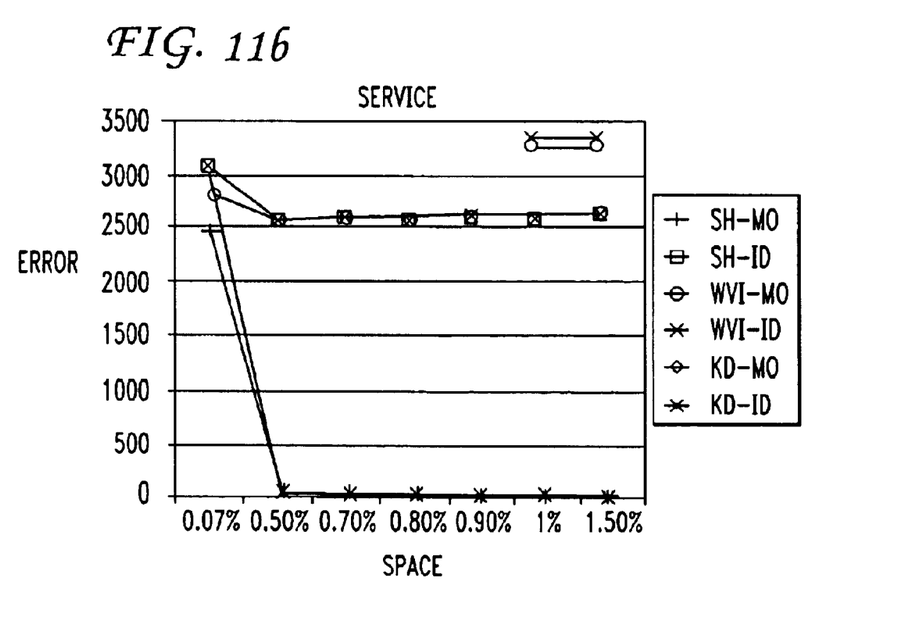

FIGS. 10(a) and (b) illustrate a comparison of the average error for the set hashing method of the present invention, as compared against a set of four different prior art methods, as discussed above. The uniform workload U was used for these experiments, and the absolute error was measured as a function of space. FIG. 10(a) is associated with experiments performed in the EVENT data set and FIG. 10(b) is associated with experiments performed in the SERVICE data set. Set hashing with both maximal overlap (MO) parsing and "greedy parsing followed by the application of independent assumption" (ID) parsing was tried. As shown in FIG. 10(a), the average error using set hashing in the EVENT data set was smaller by a factor of four when compared to the various prior art methods. The improvement was close to a factor of ten for the SERVICE data set, as shown in FIG. 10(b), where the increase with the SERVICE data set is to be expected, since there is a higher correlation between the attributes in this data set. FIGS. 11(a) and 11(b) illustrate the results for negative query experiments in these same data sets, illustrating an improvement of at least three orders of magnitude for the set hashing approach when compared to the prior art, dropping to an imperceptible level for large space selectivities in the SERVICE data set.

It is to be understood that set hashing as used in accordance with the present invention can be generalized to perform selectivity estimations for dimensions higher than the two-dimensional examples discussed above. Indeed, the superiority of the set hashing method only becomes more pronounced as the number of dimensions increases, since this approach enables an exponential number of cross-counts to be generated in linear space. However, as the dimensionality increases, the number of signature intersections needed to generate a cross-count also increases, which will in turn lead to increased error in approximating each cross-count.

Figure 12A:
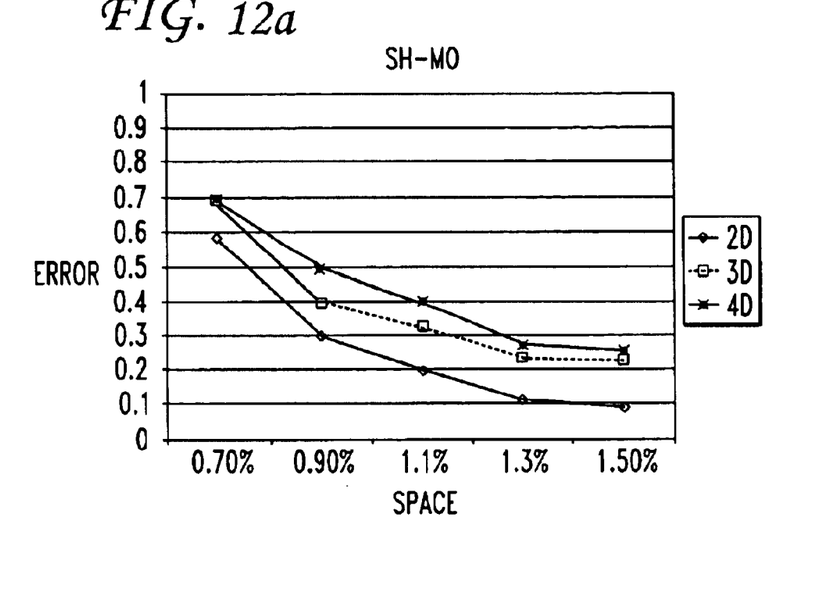
FIGS. 12(a) and 12(b) illustrate the average absolute error of the selective estimation process, as a function of the dimensionality of the data set, FIG. 12(a) formed using the set hashing technique of the present invention and FIG. 12(b) formed using a prior art technique.
Figure 12B:
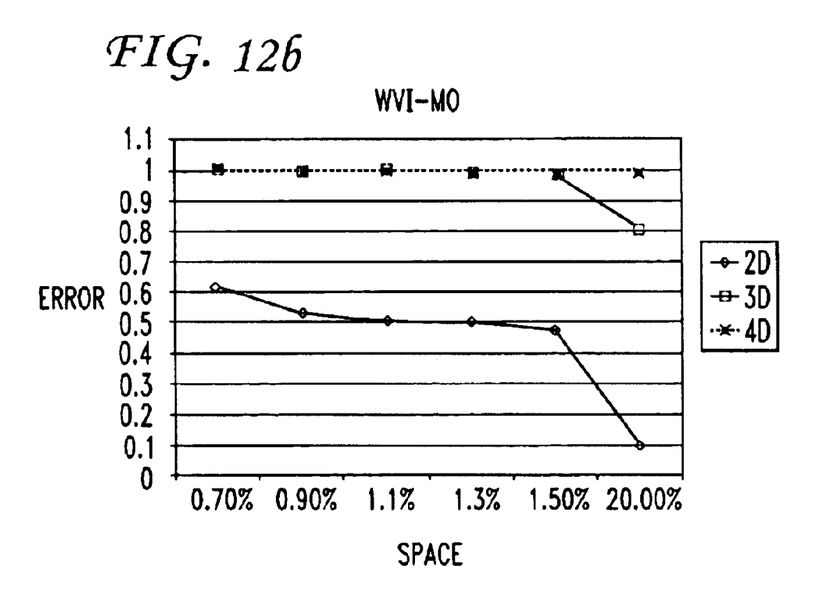

To assess the accuracy of set hashing with increasing dimensionality, an experiment was conducted using two-, three-, and four-dimensional data sets, extracted from a large warehouse of public data. Each data set contained 200,000 tuples and each attribute had a size of approximately 3MB. The workload level U defined above was used and the average-absolute-relative error was recorded as a function of space. The results are presented in FIG. 12, where FIG. 12(a) illustrates the results when using set hashing (with maximal overlap parsing) in accordance with the present invention, and FIG. 12(b) illustrates the results when using the "count-suffix tree" method of the prior art as defined above. Comparing FIG. 12(a) to FIG. 12(b), the results indicate that the accuracy of high dimensional selectivity estimation using set hashing is more favorable when compared to a high dimensional generalization of the prior art. Referring in particular to FIG. 12(a), it is shown that as space increases, the accuracy for the set hashing method of the present invention improves steadily to reach acceptable error rates, even with only 1.5% space allowed for deriving the estimation. However, as shown in FIG. 12(b), the performance of the "count-suffix tree" method of the prior art degrades significantly as the dimensionality increases. For example, when 20% of the space is devoted to selectivity estimation, the error of two-dimensional queries in the prior art drops to 10%, but the error of three-dimensional and four-dimensional queries remains above 80%. Moreover, at 20% space, the estimated selectivity using the prior art method is below 1% of the real selectivity for 80% of the three-dimensional queries and approaching 99% for the four-dimensional queries, This occurs in the prior art since most queries are parsed into many small subqueries with little overlap. Therefore, the prior art method will estimate the selectivity as the product of many selectivities, which is close to "zero" in most cases.

There are two important parameters than can affect multidimensional selectivity estimates based on set hashing: the signature length and the hash space size. With respect to signature length, it was previously shown that the accuracy of set hashing intersection estimates improve with increasing signature length. As a result, the overall estimation accuracy based on the set hashing approach will improve. However, at fixed space, increasing the length of the signatures will also limit the number of suffix tree nodes that can be kept, yielding a higher error rate.

Figure 13:
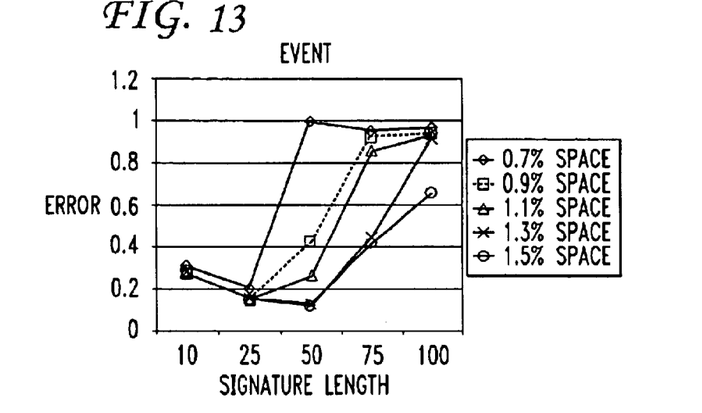
FIG. 13 contains a graph of absolute error measurement as a function of signature length for a relatively uncorrelated data set.
Figure 14:
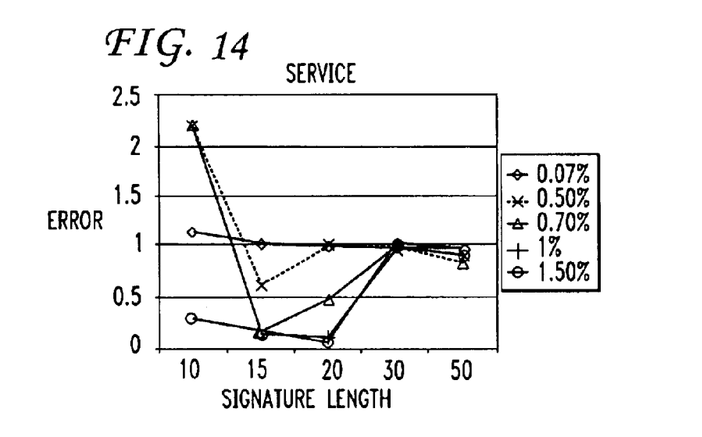
FIG. 14 contains a graph of absolute error measurement as a function of signature length for a highly correlated data set.

FIG. 13 illustrates the absolute error measurements for performing set hashing with maximal overlap (MO) parsing, as used with the EVENT data set, for signature lengths ranging between 10 and 100. Referring to FIG. 13, each separate curve corresponds to a fixed amount of storage space (ranging from 0.7% of available storage space to 1.5% of the storage space). The knee of the curves appears at a signature length of approximately 50. FIG. 14 illustrates absolute error measurements for performing set hashing with maximal overlap on the (highly correlated) SERVICE data set. In this example, the signature length was varied between 10 and 50, with the storage space ranging between 0.07% and 1.5%. Here, the knee of the curves appears at a signature length of approximately 20. Based on this data, therefore, signature length should be bounded between 20 and 100, with lower correlated data sets requiring longer signatures.

Figure 15:
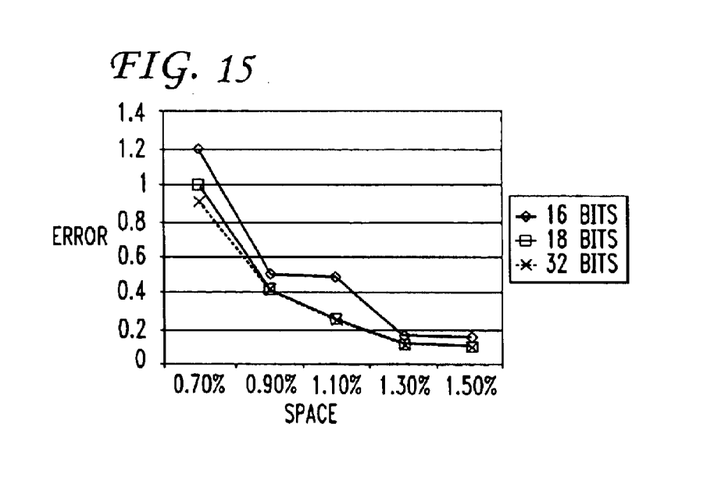
FIG. 15 contains a graph of absolute error associated with hashing techniques of the present invention as a function of the hash space size.

Clearly, a small hash space consumes less space; but to be effective, the size of the hash space should be large enough so as to avoid collisions. In order to identify an optimal hash space size, an analysis can be performed where the total number of suffix tree nodes is fixed and the accuracy of set hashing with maximal overlap parsing is compared using different hash space sizes. FIG. 15 illustrates the results of this analysis for three different hash space sizes: 2 bytes (16 bits), log N (where N is the number of tuples in the table) bits, and 4 bytes (32 bits), as used with the EVENT data set. The accuracy of log N (18) bits and 32 bits is shown as being very close. However, the accuracy of the 16 bit space size is much worse. This is intuitive since there are over 200,000 tuples in this data set and 16 bits are not enough to represent that many tuples, resulting in a large number of collisions. Once the hash space is large enough to represent all tuples, the chances of collision become so small that any value above log N (18) bits gives very good results. Similar trends can be observed for other data sets, with the conclusion that it suffices to use log N bits, where N is the total number of tuples in the data set.

In general, multidimensional substring queries are increasingly common in emerging database applications that process text data. In these and other settings, there is a need to quickly and reliably estimate the count of tuples matching substring queries on multiple attributes. The present invention proposes a unique approach to multidimensional substring selectivity estimation in which cross-counts are not explicitly stored. Rather, the cross-counts are generated as needed using set hashing. Thus, using only linear storage, an exponential number of cross-counts can be generated as needed. Although the cross-counts are not exact, but are an approximation, it has been shown that this approach significantly improves known methods in two dimensional selectivity estimation, and the performance only improves as the dimensionality increases.

What is claimed is:

1. A method of preprocessing a multidimensional data set comprising a plurality of N data elements in the form of tuples to create a pruned suffix tree structure including hashing signatures to represent each node in the pruned suffix tree, the method comprising the steps of:

a) creating a suffix tree for each dimension of data in an n-dimensional data set, forming a plurality of n suffix trees;

b) storing, for each node in each suffix tree, an exact count of a row identifiers of each data element comprising the substring associated with the node;

c) pruning each suffix tree to remove nodes with a row identifier count below a predetermined value;

d) hashing, for each node in each pruned suffix tree, the row identifiers to generate, a fixed-length signature for the associated node; and e) storing, for each node in each pruned suffix tree, the hashing signature generated in step d).

2. The method as defined in claim 1 wherein performing step c), removing nodes with a count less than two.

3. The method as defined in claim 1 wherein in performing step d), generating a signature length in the range of 10 to 100.

4. A method of estimating results of k-dimensional substring queries, method comprising the steps of:

a) constructing a suffix tree for each dimension in the k-dimensional data set, each suffix tree comprising a plurality of nodes, each node representing a parsed substring from the data set along its dimension;

b) storing, for each node in each suffix tree, an exact count of a row identifiers of each data element comprising the substring associated with the node;

c) hashing, for each node in each suffix tree, the row identifiers to generate a fixed-length signature for the associated node;

d) storing, for each node in each suffix tree, the hashing signature generated in step c);

e) parsing a given query q on each dimension k into a plurality of subqueries available in the suffix tree;

f) for each combination of subqueries created in step e), retrieving associated hash signature;

g) performing an intersection of said hash signature to generate cross counts; and h) estimating the result of the substring query by performing an algebraic combination of the cross-counts generated in step g).

5. The method as defined in claim 4 wherein in performing step a) each suffix tree is pruned to remove nodes with counts below a predetermined threshold.

6. The method as defined in claim 4 wherein in performing step e) maximal overall parsing is used.

7. The method as defined in claim 4 wherein in performing step c) generating a signature length in the range of 10 to 100.

8. The method as defined in claim 4 wherein the data sets are highly correlated and a signature length of approximately 20 is used.

9. The method as defined in claim 4 wherein the data sets are relatively uncorrelated and a signature length of approximately 50 is used.

10. The method as defined in claim 4 wherein in performing step d), maintaining a storage space of log N size for the hashing signatures, where N is the number of tuples in the data set.

* * * * *